United States Patent
Tixier

[15] 3,638,748
[45] Feb. 1, 1972

[54] AUTOMOTIVE CHASSIS-FRAME STRUCTURES

[72] Inventor: Michel Tixier, Billancourt, France

[73] Assignees: Regie Nationale Des Usines Renault, Billancourt; Automobiles Peugeot, Paris, France

[22] Filed: June 15, 1970

[21] Appl. No.: 46,035

[30] Foreign Application Priority Data

July 22, 1969 France .................................. 6924906

[52] U.S. Cl. .............................. 180/64 R, 180/93, 280/106, 296/28 F, 293/63
[51] Int. Cl. ...................................................... B62d 21/00
[58] Field of Search .................... 296/28; 180/64, 42, 93, 82; 280/106; 293/63

[56] References Cited

UNITED STATES PATENTS

| | | | |
|---|---|---|---|
| 2,485,500 | 10/1949 | Lyman | 280/106 |
| 2,838,322 | 6/1958 | Felts et al. | 280/106 |
| 2,851,302 | 9/1958 | Owen | 180/64 X |
| 2,875,841 | 3/1959 | Henderson | 280/106 X |
| 3,022,846 | 2/1962 | Thompson | 280/106 X |
| 3,073,647 | 1/1963 | Beltz | 296/28 |
| 3,149,856 | 9/1964 | Schiiberg | 296/28 X |
| 3,162,478 | 12/1964 | Richards | 280/106 X |
| 3,209,851 | 10/1965 | Collins | 180/42 |
| 3,520,550 | 7/1970 | Dysarz et al. | 280/106 |

*Primary Examiner*—Kenneth H. Betts
*Attorney*—Stevens, Davis, Miller & Mosher

[57] ABSTRACT

Chassis-frame structure of automotive vehicle, notably of vehicle having a front power unit and transmission mechanism assembly, with driving front wheels connected through thrust links to the chassis frame, characterized in that it comprises a compound chassis consisting of an assembly of three main elements, that is, a front element constituted by a pair of lower parallel longitudinal members upswept at their front ends, and by a pair of upper longitudinal members each rigidly assembled at two junction nodes with one of said lower longitudinal members so as to double same along a portion corresponding to the cradle of the power unit, transmission and front-wheel assembly by means of an upswept curved portion having an outswept forward extension beyond said lower longitudinal members and their ends assembled by means of a curved horizontal cross member, said lower longitudinal members having rear extensions, the second element consisting of an intermediate chassis member in the form of a steel pressing formed in the conventional fashion with pressed reinforcing ribs and constituting the floor of the passengers' compartment and comprising likewise pressed wells for the feet of the rear seat passengers, and finally a third or rear element consisting of a pair of parallel longitudinal members having a different relative spacing in comparison with said front longitudinal members.

7 Claims, 5 Drawing Figures

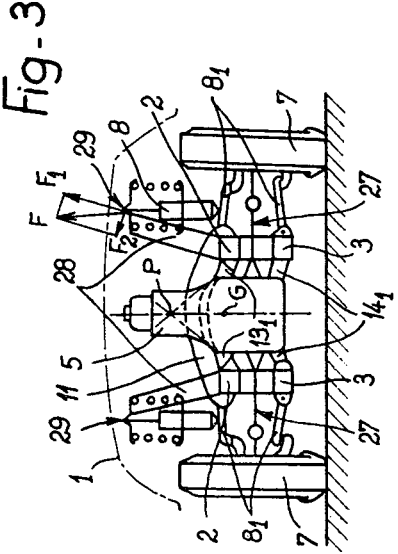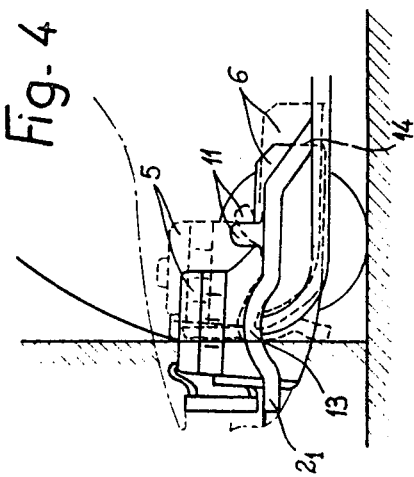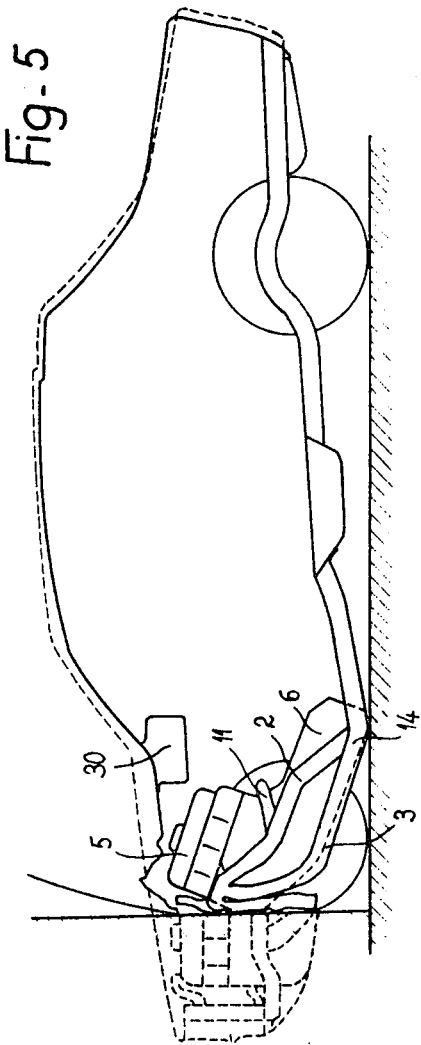

AUTOMOTIVE CHASSIS-FRAME STRUCTURES

The present invention relates to automotive vehicle chassis-frame structures notably for front-engined vehicles with front drive wheels, said structure constituting the underframe or chassis of the vehicle.

Chassis-frame of motor vehicles, notably of passengers vehicles, must have a good rigidity in order to withstand distortion stress applied to the passengers' compartment in case of crash and absorb vibration generated by the power unit, on the one hand, and also the consequences of ground unevennesses on the trains of wheels and the suspension system, on the other hand.

Besides, these chassis-frames must be constructed as simply as possible and have a minimum weight, for obvious reasons of cost and vehicle performances.

Combining these contradictory requirements by using suitable means constitutes the essential object of this invention.

After the uniform design, used for many years, which consisted of a chassis comprising a pair of longitudinal side members assembled by a number of cross members, a rigid but heavy structure if any, automotive vehicles have been constructed according to the chassis-cum-body technique whereby the inherent rigidity of the body is sufficient for imparting the necessary strength to the vehicle.

Pressed-steel floor chassis have also been constructed wherein the function of the ribbed and partly box-sectioned floor sheets constitute the rigid basic structure of the vehicle.

However, self-supporting bodies, due to their greater structural elasticity and their inherent vibration frequencies, do not ensure a satisfactory absorption of vibrations produced by the engine and transmitted from the road surface through the suspension system; therefore, such chassis-cum-body constructions constitute a source of vibratory resonance at certain speeds.

Conventional chassis comprising two longitudinal side members are used only in trucks or very large automotive vehicles, due to their substantial weight and cost.

Pressed-steel or floor-type chassis are used chiefly in light cars or small delivery vans exposed only with limited structural stress. In the case of larger vehicles, the necessity of reinforcing the floor platform make this construction noncompetitive in comparison with other structures.

It is the essential object of the present invention to provide a frame structure constituting a combination of chassis elements with a conventional self-supporting or chassis-cum-body structure, as a function of the points of action and reaction of the power unit and suspension system of the vehicle.

This structure is characterized essentially in that it comprises a compound chassis consisting of an assembly of three main elements, that is a front element constituted by a pair of lower parallel longitudinal members upswept at their front ends, and by a pair of upper longitudinal members each rigidly assembled at two junction nodes with one of said lower longitudinal members so as to double same along a portion corresponding to the cradle of the power unit, transmission and front-wheel assembly by means of an upswept curved portion having an outswept forward extension beyond said lower longitudinal members and their ends assembled by means of a curved horizontal cross member, said lower longitudinal members having rear extensions, the second element consisting of an intermediate chassis member in the form of steel pressing formed in the conventional fashion with pressed reinforcing ribs and constituting the floor of the passengers' compartment and comprising likewise pressed wells for the feet of the rear seat passengers, and finally a third or rear element consisting of a pair of parallel longitudinal members having a different relative spacing in comparison with said front longitudinal members.

According to another feature characterizing the body structure according to this invention one of the aforesaid junction or connecting points or nodes between said lower and upper longitudinal members of the first or front element of the chassis interconnects the top of each curved portion of the upper longitudinal member and the front end of the lower longitudinal member, and furthermore said second junction points support the main mountings of the power unit and of the thrust links of the driving front wheels.

On the other hand, a bow-shaped crossmember interconnects the two upper longitudinal members of the front element of the chassis behind the engine and above the gearbox, this crossmember having upswept extensions forming a relatively small angle with the vertical and adapted to support at their upper ends the bearing points of the front suspension system.

This structure is characterized inter alia by the following advantageous features:

By grouping, at very rigid junction nodes located at the front end, the main mounting points of the power unit and the mounting points of the front-wheel thrust links, the vibrations produced by the power unit and front wheel are mutually damped out at said junction nodes, the chassis elements lying at a neutral point of the transmission of said vibrations, which is reinforced by the rubber pads provided at said mounting points.

Similarly, the inherent flexion elasticity of the oblique built-in uprights bearing the springs and shock absorbers of the suspension system coact with this system for damping out the vibrations caused by road unevennesses and transmitted through the front wheels.

Finally, the type of discontinuous construction of the chassis structure (comprising relatively short longitudinal side members connected separately to a steel pressing in which very varied ribs and like reinforcing patterns are formed) provided by the present invention counteracts the generation and propagation of vibration frequencies inherent to this structure.

The power unit and front wheel assembly or grouping necessitates the reinforcement of the chassis structure by doubling the longitudinal side members only in this relatively limited zone. This leads to the use of shorter and lighter longitudinal members that can be mass-produced on smaller machines and tools.

It is one object of this invention to prevent this lighter structure from impairing the rigidity of the passengers compartment and therefore compromise the passengers' safety, while promoting the shock absorption capacity of the front portion of the vehicle.

Thus, in case of a front crash, the curvature of the front longitudinal side members and their horizontal end inclination will automatically fix its buckling point at its junction node with the lower longitudinal member, thus directing the folding effect downwards, so as to dissipate one fraction of the shock energy by effecting a corresponding lifting of the nose portion of the vehicle and possibly causing the latter to "climb" the obstacle.

A stronger shock, after this initial buckling and the crushing of the radiator, will strike directly the power unit and possibly involve the yielding and eventually the shearing of its mountings; in this case, the power unit will strike the bow-shaped crossmember in the shoulder of its rear portion. The backward torsion of this crossmember will absorb a complementary fraction of the energy produced by the crash.

Under these conditions, it will be seen that due to this very considerably shock-absorbing capacity the structure of the vehicle undergoes but a minimum distortion and that the passenger' compartment, to which only moderate crushing forces are applied, since the heaviest masses are concentrated at the front, remains substantially undamaged.

Other features characterizing this invention will appear as the following description proceeds with reference to the accompanying drawing given by way of example and wherein:

FIG. 3 illustrates in front elevational and sectional view the same structure, the section being taken in a vertical plane III—III containing the main mountings of the power unit;

FIG. 4 illustrates the distortion of the front portion of the frame structure after the latter has absorbed a front shock, FIG. 5 shows the configuration assumed by the frame structure and the engine position in case of a still stronger front shock.

Figure 1:
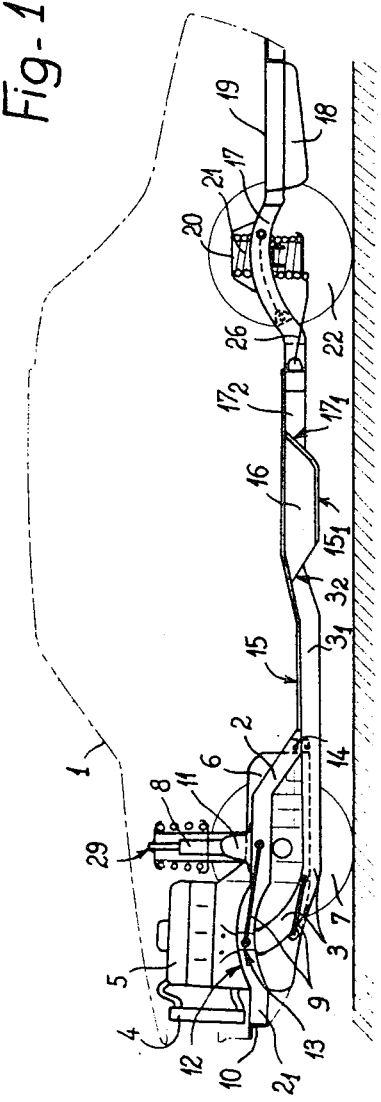
FIG. 1 illustrates diagrammatically in elevational view the structure of an automotive vehicle constructed according to this invention.

Referring first to FIG. 1 showing in dash and dot lines 1 the external contour of the bodywork of the vehicle, the front frame structure, comprising a pair of upper longitudinal members 2 and a pair of lower longitudinal members 3, supports the power unit assembly comprising the radiator 4, the engine 5 and the transmission mechanism or gearbox 6, together with the front train of wheels including the wheels proper 7, of which the transmission, steering and braking mechanisms, not shown, are connected to the chassis through the suspension members 8, on the one hand, and thrust links 9, on the other hand.

The upper longitudinal side members 2 are interconnected at their front outswept portions $2_1$ by a curved horizontal crossmember 10 and behind the engine 5 by an arcuated or bow-shaped crossmember 11 overlying the transmission mechanism or gearbox 6.

Each upper longitudinal side members 2 comprises a convex curved portion 12 corresponding substantially to the zone surrounding the engine 5; the top 13 of the curved portion 12 constitutes the junction node whereat it is connected to the front end of the lower longitudinal member 3. The latter comprises a rear extension $3_1$ behind the rear junction node 14, which lies under the floor-forming steel pressing 15 of the passengers' compartment, said extension $3_1$ being rigidly connected to said steel pressing 15. The rear ends $3_2$ of longitudinal side members 3 are welded to the front wall of the wells 16 constituting the floor of the rear seats.

Similarly, the front ends $17_1$ of the pair of rear longitudinal members 17 are connected to the rear wall of said wells 16. The front portion $17_2$ of these longitudinal members 17 extend under the floor sheet 15 and are welded or otherwise fastened thereto. This sheet has formed therein a great number of pressed ribs $15_1$ for stiffening it and preventing the transmission of undesired vibration. The longitudinal rigidity of the floor portion of the passengers' compartment is also reinforced by longitudinal external or marginal side members $15_2$ of known construction, for assembling the floor with the upper portion of the vehicle body 1.

The fuel tank 18 is fitted between the rear portions of the rear longitudinal members 17; its flat and reinforced bottom 19 is level with the upper edge of these longitudinal members and constitutes the floor of the boot.

The bearing points 20 of the suspension system 21 of the train of rear wheels 22 are supported by the intermediate portion of the rear longitudinal members 17.

Figure 2:
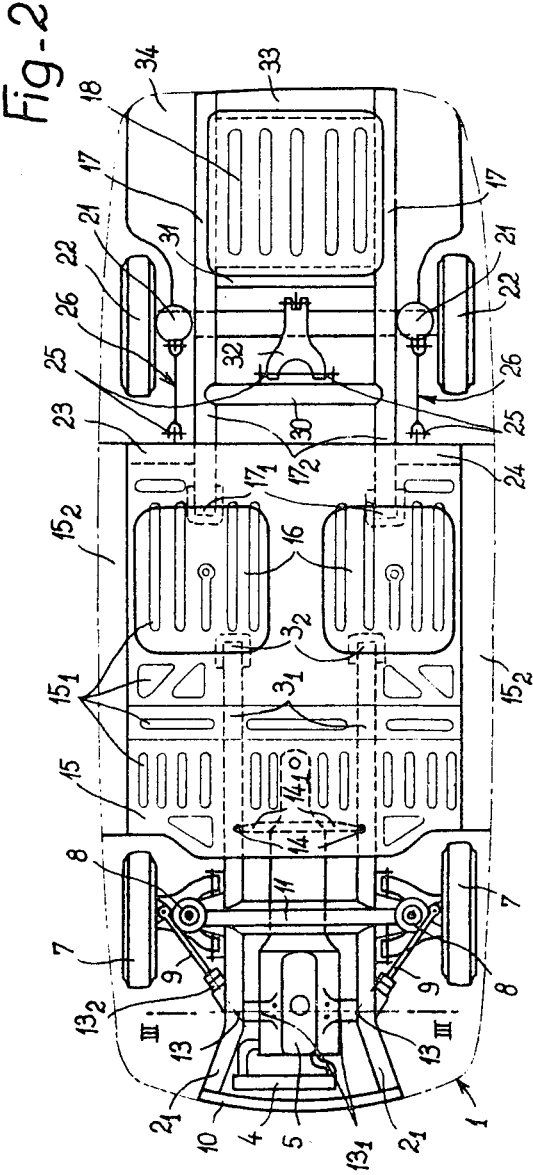
FIG. 2 illustrates the same structure but seen in plane view from above.

In FIG. 2 the arrangement of the half crossmembers 23, 24 supporting the anchor points 25 of the thrust links or arms 26 of the rear suspension are clearly shown; these crossmembers are fastened to the rear edge of the floor pressing 15; another crossmember 30 disposed between the rear longitudinal members 17 has pivotally mounted thereon a link 32 connected to the rear axle; other crossmembers 31 and 33 complete the framing of tank 18; at the front and rear ends thereof. Sheets 34 also welded to the bodywork 1 form lateral extensions of the top of tank 18 to constitute the boot floor.

The power unit and transmission mechanism assembly 5, 6 is connected to the underframe at the junction nodes 13 by means of the central engine mountings $13_1$ and at the other junction nodes 14 by means of the rear gearbox mountings $14_1$, these mountings being provided according to the well-known technique with rubber blocks or like resilient means.

The thrust links 9 go through the junction tops 13; they are also, as known in prior art, on the points $3_2$ of the frame structure through the medium of the rubber blocks.

The front elevational view of the front train of wheel shown in FIG. 3 illustrates the arrangement of the upper and lower wishbone or like suspension links $8_1$ of suspension system 8, the transmission shafts 27 provided with universal joints for transmitting the drive to the front wheels, as well as the oblique uprights 28 rigid with the upper front longitudinal members 2 and also with the arcuated crossmember 11, these uprights 28 receiving at their upper ends 29 the bearing points of the suspension elements 8.

FIG. 4 shows the front portion of the vehicle of FIG. 1; the dash line illustrates the profile contour of the elements after the chassis front has struck an obstacle, with the consequent backward and upward displacement of the power unit and gearbox assembly 5, 6 due to the abutment thereof against the arcuated crossmember 11 somewhat bent backwards by the impact.

During the shock, the concentration of the reactions produced by the main engine mountings at nodal points 13 with the thrust or traction reactions exerted by the front trains of wheels against the thrust links 9 is such that it limits considerably the transmission of the possible effects of these actions, in the form of elastic distortion and vibration, to the chassis elements 2 and 3 lying in a substantially neutral position between these sources of mechanical strain and vibration. On the other hand, the inertia of the mass comprising the power unit and transmission mechanism assembly tends in all cases to counteract the action of the front driving wheels, thus causing a mutual compensation of their reaction at said points 13.

The vertical reaction F of the suspension against the bearing or junction point 29 (FIG. 3) is decomposed into two forces: $F_1$ in the longitudinal direction of upright 28, and $F_2$ at right angles thereto. In case of considerable stresses beyond the capacity of suspension 8, the inherent elasticity of upright 28 will assist in absorbing the component $F_2$ of these stresses, by a sinking flexion in relation to its junction to the longitudinal member 2 and crossmember 11.

The positioning of the bearing points of the engine 5 at 13, that is, at the top of the curved portion 12 of longitudinal members 2 is such that the engine mounting points are raised to the uppermost permissible level, the bearing reactions converging to a point P of theoretical anchoring (FIG. 3). This last-mentioned point lies well above the center of gravity G of the power unit and provides a substantially pendular suspension thereof.

Thus, in case of front crash, the energy thereof can be absorbed by the thrusting of the crossmember 10 and a torsion of the oblique ends $2_1$ of the upper longitudinal members 2 without endangering the mechanical components of the vehicle.

A stronger shock will subsequently buckle the upper longitudinal members 2 at points 13, the portion $2_1$ being thus bent downwards so that the front portion of the vehicle is raised accordingly. In the case of impact into an obstacle of relatively moderate height, this lifting effect and the "sledge" shape of the front chassis element facilitates the climbing of the obstacle and the corresponding absorption of the shock.

If a greater impact energy is applied to the front of the vehicle, it will be absorbed by the engine 5 itself, after the radiator 4 has been crushed, by bending and shearing the connecting members $13_1$ and $14_1$. The backward shifting of the engine will cause it to strike the crossmember 11 of which the torsion attended by the backward bending thereof will further absorb a considerable amount of energy.

The front portion of the vehicle will then have roughly the configuration shown in dash lines in FIG. 4, without casing any distortion of the passengers' compartment. This distortion will occur only at a later stage, in case the front end were "folded" about the junction point 14 as shown diagrammatically in FIG. 5 wherein the original shape of the vehicle is shown in dash lines. In this case the structure according to this invention will permit of lifting the power unit and gearbox assembly against the transverse member of the dashborad or facia 30 by pivoting about the end of the gearbox 6 bearing on the ground, thus absorbing an additional amount of energy before the power unit eventually penetrates dangerously into the passengers' compartment.

By way of example, a full-size front crash test carried out with a vehicle having a chassis-body structure according to this invention, weighing 1,007 kilograms and driven at 30 m.p.h. was attended by a backward thrust of 16.73 inches from the front to the wheel axis, the engine receding by 16.15 inches, while the body structure as contracted by 1.85 inches, the total contraction of the vehicle being 18.88 inches; finally, the appearance of the vehicle after the crash was substantially as shown in FIG. 5, thus proving the existence of additional possibilities of absorption by accentuating the bending and buckling of the longitudinal members 2 and 3 while tilting the engine against the beam of the dashboard or facia 30.

Under these conditions it is clear that the chassis structure according to this invention is capable of giving to front-engined vehicles a capacity of absorbing front shocks at least equivalent to that hitherto obtained only with rear-engined vehicles.

Although a single from of embodiment of the invention has been shown and described herein, it will readily occur to those conversant with the art that various modifications may be brought thereto without departing from the spirit and scope of the invention as set forth in the appended claims.

What is claimed as new is:

1. Chassis-frame structure of automotive vehicle, notably of vehicle having a front power unit and transmission mechanism assembly, with driving front wheels connected through thrust links to the chassis frame, characterized in that it comprises a compound chassis consisting of an assembly of three main elements, that is, a front element constituted by a pair of lower parallel longitudinal members upswept at their front ends, and by a pair of upper longitudinal members each rigidly assembled at two junction nodes with one of said lower longitudinal members so as to double same along a portion corresponding to the cradle of the power unit, transmission and front-wheel assembly by means of an upswept curved portion having an outswept forward extension beyond said lower longitudinal members and their ends assembled by means of a curved horizontal crossmembers, said lower longitudinal members having rear extensions, the second element consisting of an intermediate chassis member in the form of a steel pressing formed in the conventional fashion with pressed reinforcing ribs and constituting the floor of the passenger's compartment and comprising likewise pressed wells for the feet of the rear seat passengers, and finally a third or rear element consisting of a pair of parallel longitudinal members having a different relative spacing in comparison with said front longitudinal members.

2. Chassis-frame structure according to claim 1, wherein a first front junction node of said upper and lower longitudinal members of said front chassis element interconnects the top of the curved portion of each upper longitudinal member and the front end of the lower longitudinal member, and furthermore said second junction point interconnects the rear end of the upper longitudinal member and a portion of said lower longitudinal member which is located at the rear of the transmission mechanism and extends to the rear.

3. Chassis-frame structure according to claim 1, wherein the rear ends of the upper longitudinal members and the rear extensions of the lower longitudinal members of the front element of the chassis are rigidly connected to the steel pressing constituting the intermediate chassis element and the floor of the passengers' compartment, said rear portions of the lower longitudinal members extending under said pressing, their rear ends being rigidly assembled with the front walls of said wells formed in said pressing.

4. Chassis-frame structure according to claim 1, wherein the front portions of the rear longitudinal members constituting said third or rear element extend under the steel pressing of said intermediate element and the front ends of said rear longitudinal members are rigidly assembled with the rear walls of sad wells formed in said pressing.

5. Chassis-frame structure according to claim 2, wherein the front junction nodes of the upper and lower front longitudinal members receive on the one hand the main bearing points of the power unit and transmission mechanism assembly, and on the other hand the anchoring points of the thrust links of the driving wheels, the other junction nodes of the front longitudinal members receiving furthermore the secondary bearing points of the power unit and transmission mechanism assembly.

6. Chassis-frame structure according to claim 1, wherein a bow-shaped crossmember interconnects the pair of upper front longitudinal members behind the power unit and above the transmission mechanism, said crossmember having at its ends integral oblique extensions constituting nearly vertical uprights receiving at their upper ends the bearing points of the front suspension elements.

7. Chassis-frame structure according to claim 1, wherein a fuel tank having a flat and reinforced top constitutes the floor of the boot and is rigidly fitted between said pair of rear longitudinal members.

* * * * *